United States Patent
Mori et al.

(10) Patent No.: US 11,780,368 B2
(45) Date of Patent: Oct. 10, 2023

(54) ELECTRONIC MIRROR SYSTEM, IMAGE DISPLAY METHOD, AND MOVING VEHICLE

(71) Applicant: Panasonic Intellectual Property Management Co., Ltd., Osaka (JP)

(72) Inventors: Toshiya Mori, Osaka (JP); Ken'ichi Kasazumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 105 days.

(21) Appl. No.: 17/484,976

(22) Filed: Sep. 24, 2021

(65) Prior Publication Data

US 2022/0009414 A1 Jan. 13, 2022

Related U.S. Application Data

(63) Continuation of application No. PCT/JP2020/005831, filed on Feb. 14, 2020.

(30) Foreign Application Priority Data

Mar. 27, 2019 (JP) .................................. 2019-061922

(51) Int. Cl.
 *B60R 1/00* (2022.01)
 *H04N 13/302* (2018.01)
 (Continued)

(52) U.S. Cl.
 CPC ................ *B60R 1/00* (2013.01); *G02B 30/27* (2020.01); *H04N 7/181* (2013.01);
 (Continued)

(58) Field of Classification Search
 CPC .............. B60R 1/00; B60R 2300/8066; B60R 2300/205; B60R 1/23; B60R 1/31;
 (Continued)

(56) References Cited

U.S. PATENT DOCUMENTS

2012/0229596 A1\* 9/2012 Rose .................... H04N 23/698
 348/36
2013/0169792 A1\* 7/2013 Mathes .............. B62D 15/0275
 348/119
(Continued)

FOREIGN PATENT DOCUMENTS

JP 2009-083618 4/2009
JP 2011-073466 4/2011
(Continued)

OTHER PUBLICATIONS

Official Communication issued in International Patent Application No. PCT/JP2020/005831, dated Apr. 28, 2020, along with an English translation thereof.

*Primary Examiner* — Farzana Hossain

(74) *Attorney, Agent, or Firm* — Greenblum & Bernstein, P.L.C.

(57) ABSTRACT

An electronic mirror system presents circumstances surrounding a moving vehicle by displaying an image presenting the circumstances surrounding the moving vehicle. The electronic mirror system includes an image display and an optical system. The image display displays, every time image data is acquired from an image capturing unit, the image, based on the image data acquired from the image capturing unit, on a display screen. The image capturing unit continuously shoots video presenting the circumstances surrounding the moving vehicle. The optical system condenses, into an eye box, a light beam representing the image displayed on the display screen to make a user, who has a viewpoint inside the eye box, view a virtual image based on the image displayed on the display screen. The display screen is arranged to be tilted with respect to an optical path that leads from the display screen to the optical system (30).

20 Claims, 7 Drawing Sheets

(51) Int. Cl.
*H04N 13/351* (2018.01)
*H04N 13/111* (2018.01)
*G02B 30/27* (2020.01)
*H04N 7/18* (2006.01)

(52) U.S. Cl.
CPC ......... *H04N 13/111* (2018.05); *H04N 13/302* (2018.05); *H04N 13/351* (2018.05); *B60R 2300/8066* (2013.01)

(58) Field of Classification Search
CPC ............ G02B 30/27; G02B 2027/0134; G02B 2027/0138; G02B 2027/014; G02B 27/01; H04N 7/181; H04N 13/111; H04N 13/302; H04N 13/351; H04N 7/183; H04N 13/363; H04N 13/117; H04N 13/305; G03B 35/18
See application file for complete search history.

(56) References Cited

U.S. PATENT DOCUMENTS

| | | | |
|---|---|---|---|
| 2015/0085117 A1* | 3/2015 | Chang | B60R 1/00 348/148 |
| 2018/0345867 A1* | 12/2018 | Imamura | H04N 13/376 |
| 2019/0265468 A1* | 8/2019 | Hirata | G09G 3/36 |
| 2019/0283607 A1 | 9/2019 | Murao et al. | |
| 2019/0299858 A1* | 10/2019 | Imamura | B60R 1/00 |
| 2020/0247240 A1* | 8/2020 | Hirata | G06F 3/0421 |
| 2022/0013046 A1* | 1/2022 | Mori | G09G 3/003 |

FOREIGN PATENT DOCUMENTS

| | | |
|---|---|---|
| JP | 2016-102965 | 6/2016 |
| JP | 2018-058521 | 4/2018 |
| JP | 2018-203245 | 12/2018 |
| WO | 2018/101170 | 6/2018 |

* cited by examiner

ELECTRONIC MIRROR SYSTEM, IMAGE DISPLAY METHOD, AND MOVING VEHICLE

CROSS-REFERENCE TO RELATED APPLICATIONS

The present application is a Bypass Continuation of International Application No. PCT/JP2020/005831 filed on Feb. 14, 2020, which is based upon, and claims the benefit of priority to, Japanese Patent Application No. 2019-061922, filed on Mar. 27, 2019. The entire contents of both applications are incorporated herein by reference.

TECHNICAL FIELD

The present disclosure generally relates to an electronic mirror system, an image display method, and a moving vehicle. More particularly, the present disclosure relates to an electronic mirror system for displaying an image based on image data provided by an image capturing unit, an image display method, and a moving vehicle including such an electronic mirror system.

BACKGROUND ART

JP 2009-83618 A discloses an electronic mirror system including: an image capture device (image capturing unit) for capturing an image as a rear view or a side view of a vehicle traveling; and a display device (image display unit) for presenting, as video, a video signal supplied from the image capture device. The display device is implemented as, for example, a liquid crystal display. The display device is installed inside the vehicle at a position where the driver may easily monitor the video on the display device.

With the electronic mirror system of JP 2009-83618 A, however, when the driver is shifting his or her gaze from the traffic on the road a several ten meters ahead of him or her to the video on the display device only a few ten centimeters away from him or her, it takes some time for him or her to find a focus on the video, thus making the video on the display device not easily visible for him or her.

SUMMARY

The present disclosure provides an electronic mirror system, an image display method, and a moving vehicle, all of which are configured or designed to make the video more easily visible for the driver.

An electronic mirror system according to an aspect of the present disclosure presents circumstances surrounding a moving vehicle by displaying an image presenting the circumstances surrounding the moving vehicle. The electronic mirror system includes an image display and an optical system. The image display displays, every time image data is acquired from an image capturing unit, the image, based on the image data acquired from the image capturing unit, on a display screen. The image capturing unit continuously shoots video presenting the circumstances surrounding the moving vehicle. The optical system condenses, into an eye box, a light beam representing the image displayed on the display screen to make a user, who has a viewpoint inside the eye box, view a virtual image based on the image displayed on the display screen. The display screen is arranged to be tilted with respect to an optical path that leads from the display screen to the optical system.

[0007] An image display method according to another aspect of the present disclosure is a method for displaying the image on the image display included in the electronic mirror system described above. The image display method includes first, second, third, and fourth processing steps. The first processing step includes acquiring image data from the image capturing unit. The second processing step includes acquiring distance data about a distance in a real space between a target captured in the image displayed on the image display and the eye box. The third processing step includes producing, based on the image data and the distance data, stereoscopic image data to make a user, who has a viewpoint inside the eye box, view a stereoscopic virtual image of the target. The fourth processing step includes displaying, on the display screen of the image display, a stereoscopic rendering image of a stereoscopic rendering part based on the stereoscopic image data.

A moving vehicle according to still another aspect of the present disclosure includes: a moving vehicle body that moves; and the electronic mirror system described above installed in the moving vehicle body.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION (1) Overview

Figure 1:
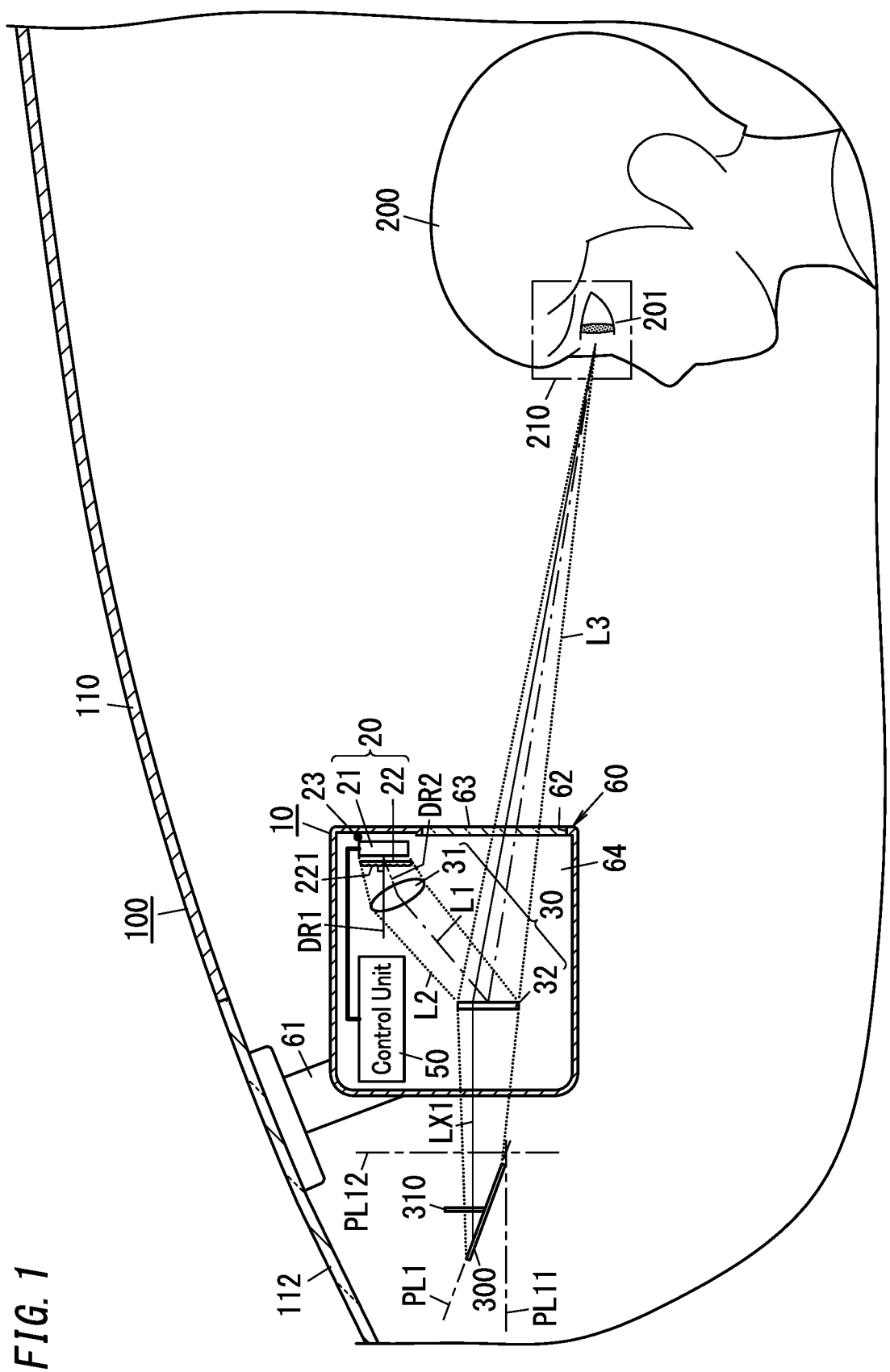
FIG. 1 schematically illustrates an electronic mirror system according to an exemplary embodiment of the present disclosure.
Figure 2:
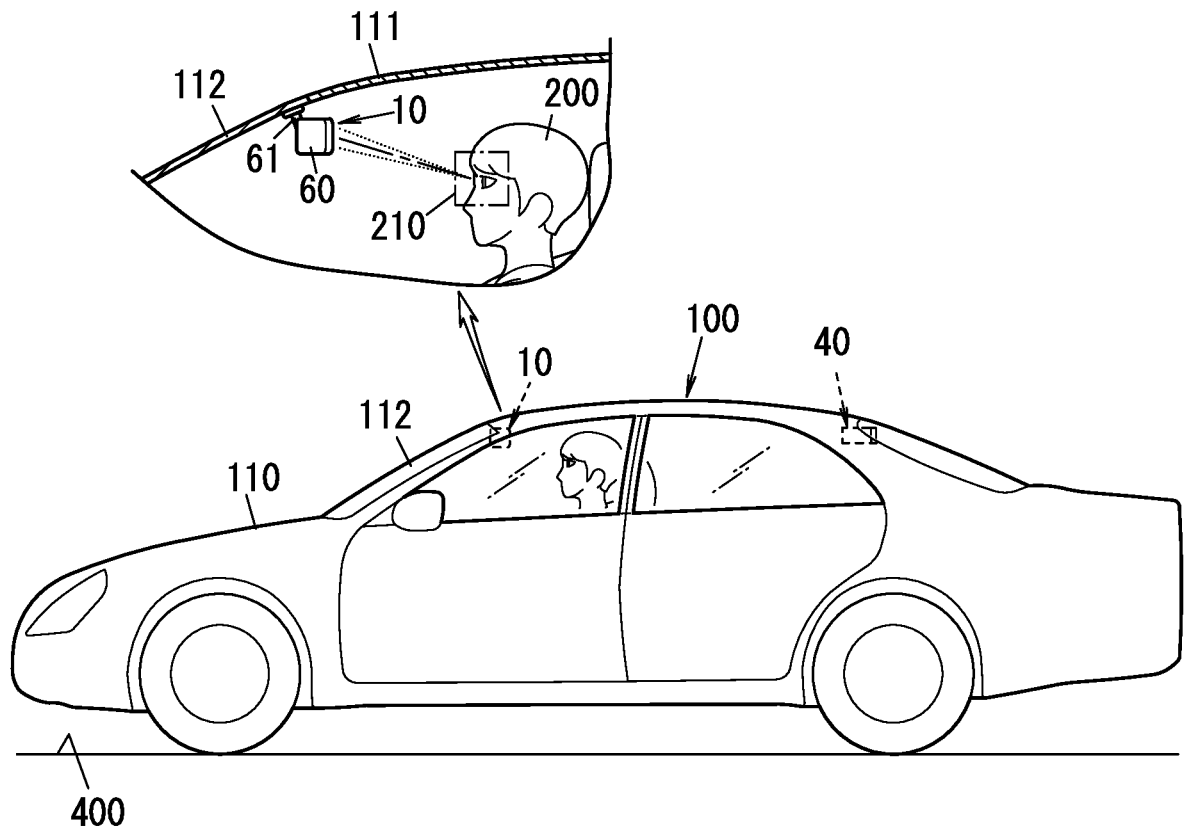
FIG. 2 schematically illustrates a moving vehicle including the electronic mirror system.

An electronic mirror system 10 according to an exemplary embodiment may be used, for example, in an automobile 100 as an exemplary moving vehicle as shown in FIGS. 1 and 2. Note that the drawings to be referred to in the following description of embodiments are all schematic representations. Thus, the ratio of the dimensions (including thicknesses) of respective constituent elements illustrated on the drawings does not always reflect their actual dimensional ratio.

Figure 3:
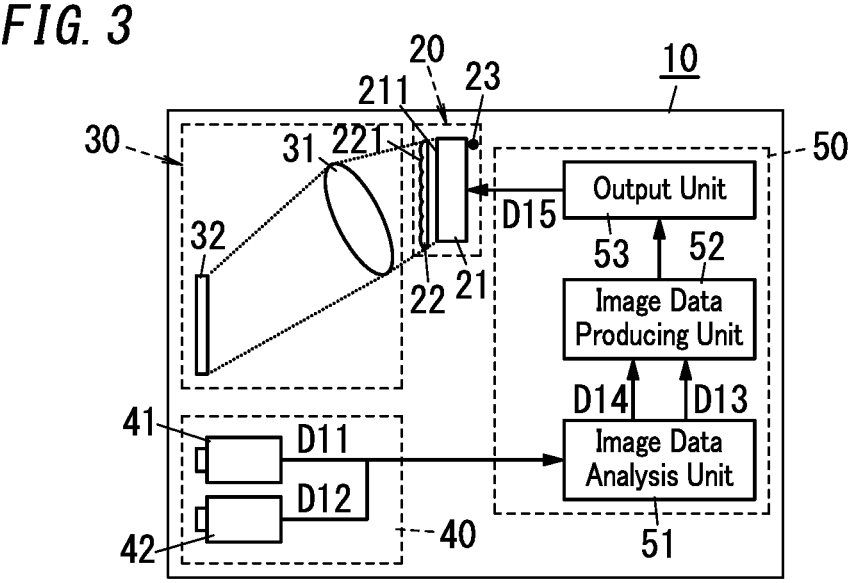
FIG. 3 is a schematic block diagram of the electronic mirror system.

The electronic mirror system 10 is configured to present the circumstances surrounding the automobile 100 (as an exemplary moving vehicle) by displaying at least one image representing the circumstances surrounding the automobile 100. In an exemplary embodiment to be described below, the electronic mirror system 10 presents, as a moving picture, the circumstances surrounding the automobile 100 by consecutively displaying a series of images representing the circumstances surrounding the automobile 100. The electronic mirror system 10 includes an image display unit 20 and an optical system 30 as shown in FIGS. 1 and 3. The image display unit 20 presents, on a display screen 221, a series of images based on image data acquired from an image capturing unit 40. In other words, every time the image data is acquired from the image capturing unit 40 that continuously shoots video presenting the circumstances surroundings the moving vehicle 100, the image display unit 20 displays one of the series of images based on the image data acquired from the image capturing unit 40. The optical system 30 condenses, into an eye box 210, a light beam representing one of the series of images displayed on the display screen 221, thereby making a user 200 (such as the driver of the automobile 100), who has a viewpoint 201 inside the eye box 210, view a virtual image 300 based on the one of the series of images displayed on the display screen 221. The display screen 221 is arranged to be tilted with respect to an optical path L1 leading from the display screen 221 to the optical system 30. As used herein, the expression "the image capturing unit 40 continuously shoots video presenting the circumstances surrounding the moving vehicle 100" may refer to not only shooting video presenting the circumstances surrounding the moving vehicle 100 literally without a break but also shooting video presenting the circumstances surrounding the moving vehicle 100 intermittently at a frame rate (e.g., falling within the range from a few ten to several hundred frames per second [FPS]) which is high enough to avoid making the moving picture look unnatural to the human eyes. The image display unit 20 displays, on the display screen 221, the series of images based on the image data that has been acquired intermittently from the image capturing unit 40, thereby making the user 200 view the images as if a moving picture were being displayed.

In this case, the optical system 30 condenses a light beam, representing one of the series of images displayed on the display screen 221, into the eye box 210 by reflecting and/or refracting the light beam. In the embodiment to be described below, the optical system 30 is implemented as a combination of a lens 31 such as a biconvex lens and a mirror 32 such as a plane mirror. Note that the combination of the lens 31 and the mirror 32 may be changed as appropriate according to the size of the display screen 221, a zoom power, a viewing distance, and other parameters. The lens 31 does not have to be a biconvex lens but may also be a convex lens or a concave lens. The mirror 32 does not have to be a plane mirror but may also be a concave mirror, for example. Also, the optical system 30 may be a combination of a plurality of lenses or a combination of a plurality of mirrors as well. Alternatively, the optical system 30 may even be configured as a single optical member (such as a single lens or a single mirror).

Figure 4:
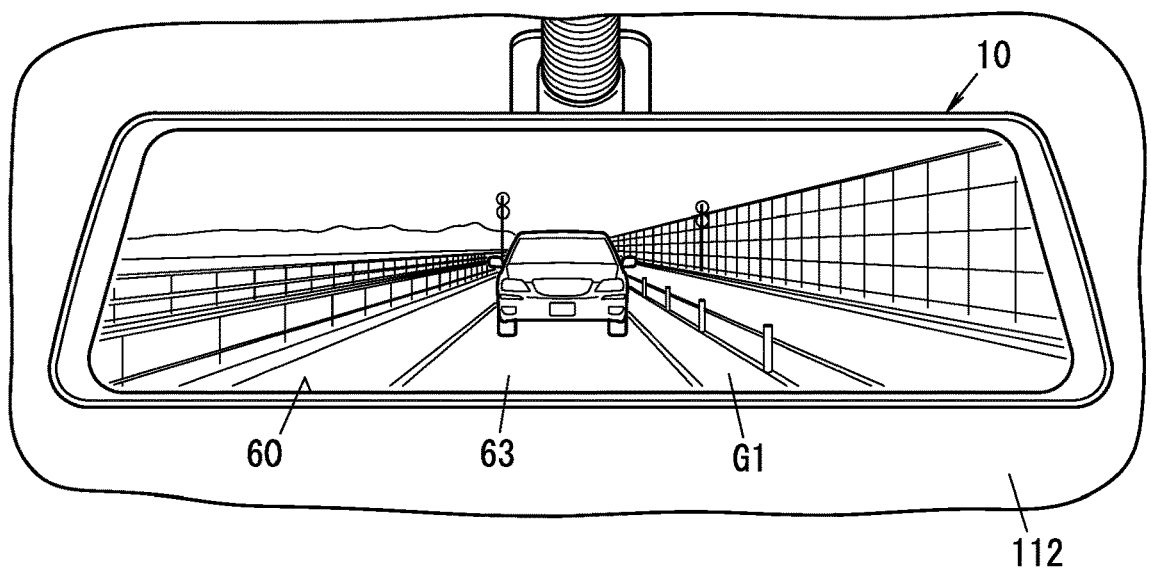
FIG. 4 illustrates a state where the electronic mirror system is used.

A light beam representing one of the series of images displayed on the display screen 221 of the image display unit 20 is condensed by the optical system 30 into the eye box 210. This allows the user 200 who has a viewpoint 201 inside the eye box 210 to view the one of the series of images represented by the light beam condensed by the optical system 30. That is to say, the user 200 may view a virtual image 300 (see FIG. 1) based on the one of the series of images displayed on the display screen 221 by viewing the one of the series of images that has been magnified by the lens 31 of the optical system 30 and then reflected by the mirror 32. In other words, the virtual image 300 herein refers to an image produced, when a light beam emerging from the image display unit 20 is reflected from the mirror 32 of the optical system 30, by the reflected light beam as if an object were actually present in the viewing direction of the user 200. FIG. 4 illustrates an exemplary image G1 presented to the user 200 when the light beam, representing one of the series of images displayed on the display screen 221 of the image display unit 20, is condensed into his or her eye box 210 after having been reflected from the mirror 32 of the optical system 30. When the electronic mirror system 10 condenses such a light beam representing the image G1 into the user's 200 eye box 210, the user 200 is allowed to view the virtual image 300 that makes him or her feel as if an object were actually present before him or her in his or her viewing direction.

Meanwhile, various objects present in the surroundings of the automobile 100 are captured in the image G1. Examples of those objects include the traveling surface 400 of the road on which the automobile 100 is traveling, road signs installed along the road, guardrails and protective fences, buildings facing the road, other automobiles and motorcycles running around the automobile 100, pedestrians, and the sky. In general, the objects captured in an upper part of the image G1 (such as the sky) are located more distant from the objects captured in a lower part of the image G1 (such as the road near the automobile 100). The virtual image 300 projected by the electronic mirror system 10 toward the user 200 is viewed by the user 200 as if the object corresponding to an upper end portion of the image G1 were located more distant from the eye box 210 than the object corresponding to a lower end portion of the image G1, thus giving the virtual image 300 a natural sense of distance. This reduces the chances of making the user 200 find unnatural the image G1 projected by the electronic mirror system 10. In addition, this may also reduce, when the user 200 who has been fixing his or her gaze on the traffic on the road in front of him or her shifts his or her gaze to the image G1 projected by the electronic mirror system 10, the focus adjustment for the user 200. This allows shortening the time it takes for him or her to adjust and find the focus, thus contributing to increasing the degree of visibility of the image G1 for him or her.

Note that the electronic mirror system 10 according to this embodiment projects the virtual image 300 of all of various objects captured in the image G1 but the stereoscopic rendering target (which will be hereinafter referred to as "plane rendering parts") onto the plane PL1. In addition, the electronic mirror system 10 also projects the virtual image 310 of the stereoscopic rendering target, among various objects captured in the image G1, onto a plane intersecting at right angles with the traveling surface 400 (i.e., a plane parallel to the plane PL12), thus enabling conducting a stereoscopic display operation on the stereoscopic rendering target. Optionally, the plane PL1 may also be made substantially parallel to the plane PL11 by changing the relative arrangement of the image display unit 20 and the optical system 30. A technique by which the electronic mirror system 10 projects the virtual image 300 of the plane rendering parts and the virtual image 310 of the stereoscopic rendering target will be described in detail later in the "(2.1.3) Image display unit" section.

(2) Details

Next, an electronic mirror system 10 according to this embodiment will be described in detail with reference to the accompanying drawings.

(2.1) Configuration

As shown in FIGS. 1 and 3, the electronic mirror system 10 according to this embodiment includes an image display unit 20 and an optical system 30. The electronic mirror system 10 further includes an image capturing unit 40 and a control unit 50. The electronic mirror system 10 further includes a housing 60 for housing the image display unit 20, the optical system 30, and the control unit 50 therein.

The electronic mirror system 10 according to this embodiment is installed in a moving vehicle body 110 of an automobile 100 as an exemplary moving vehicle. That is to say, the moving vehicle (automobile 100) includes the moving vehicle body 110 designed to move and the electronic mirror system 10 provided as a piece of onboard equipment for the moving vehicle body 110.

Next, the housing 60, the image capturing unit 40, the image display unit 20, the optical system 30, and the control unit 50 as respective constituent elements of the electronic mirror system 10 will be described one by one with reference to the accompanying drawings.

(2.1.1) Housing

The housing 60 may be a molded product of a synthetic resin, for example. The housing 60 may be formed in the shape of a rectangular parallelepiped with an internal chamber 64 as shown in FIG. 1. In the internal chamber 64, housed are the image display unit 20, the optical system 30, the control unit 50, and other members.

The housing 60 is installed on a front portion, located close to a windshield 112, of a roof 111 of the moving vehicle body 110 so as to come into sight of the user 200 who is seated on a front seat 103 (see FIGS. 1 and 2). The housing 60 is mounted on the roof 111 of the moving vehicle body 110 via a supporting member 61 so as to be suspended from the roof 111 and not to obstruct the user's 200 front sight. The housing 60 is formed in such a shape that when installed in the moving vehicle body 110, its dimension measured in the rightward/leftward direction (i.e., along the width of the vehicle) is smaller than its dimension measured in the upward/downward direction or its dimension measured in the forward/backward direction with respect to the moving vehicle body 110.

A rear surface of the housing 60 (i.e., a rear wall of the housing 60) has a through hole 62 penetrating through the rear wall of the housing 60. The dimension of the through hole 62 as measured in the rightward/leftward direction (i.e., the direction perpendicular to the upward/downward direction and the forward/backward direction) is larger than its dimension as measured in the upward/downward direction. The ratio of its dimension as measured in the rightward/leftward direction (i.e., its longer-side dimension) to its dimension as measured in the upward/downward direction (i.e., its shorter-side dimension) may be approximately 3:1 to 6:1. A transparent window member 63 of glass, for example, is fitted into the through hole 62. The light beam reflected from a mirror 32 of the optical system 30 is transmitted through the window member 63 and condensed into the eye box 210 to allow the user 200, who has a viewpoint 201 inside the eye box 210, to view an image G1 projected by the optical system 30.

(2.1.2) Image Capturing Unit

The image capturing unit 40 includes a plurality of (e.g., two) cameras 41, 42 having mutually different shooting directions. The cameras 41, 42 may each be a digital camera with the capability of shooting a moving picture. The two cameras 41, 42 are arranged such that the respective shooting ranges of the cameras 41, 42 overlap with each other at least partially. Each of the cameras 41, 42 shoots video, presenting a rear view of the automobile 100, at a predetermined frame rate and outputs image data to the control unit 50. In this embodiment, the two cameras 41, 42 shoot video presenting the rear view of the automobile 100 from mutually different directions. This allows the control unit 50 to determine, by triangulation method using the image data provided by the cameras 41, 42 and information about the installation positions of the cameras 41, 42, the distance to an object in the images captured by the cameras 41, 42.

In this embodiment, the image capturing unit 40 includes the two cameras 41, 42 having mutually different shooting directions. Alternatively, the image capturing unit 40 may also include three or more cameras having mutually different shooting directions.

(2.1.3) Image Display Unit

The image display unit 20 includes a display device 21 and a lens array 22. The image display unit 20 has the capability of displaying a stereoscopic image by the light field method, according to which an object in an image captured is made to look stereoscopic by reproducing light beams emerging from the object in a plurality of directions.

The display device 21 is housed at an upper rear corner of the internal chamber 64 in the housing 60 such that the display screen 211 faces forward. The display screen 211 of the display device 21 has a rectangular shape corresponding to the shape of the image G1 to be projected toward the user 200. On the display screen 211 of the display device 21, a plurality of pixels X0 (see FIG. 5) are arranged to form an array. The plurality of pixels X0 of the display device 21 emits light beams under the control of the control unit 50. As a result, an image to be displayed on the display screen 211 is formed by the light beams emitted from the display screen 211 of the display device 21. The display device 21 may be implemented as, for example, a liquid crystal display or an organic electroluminescent (OEL) display, for example.

Figure 5:
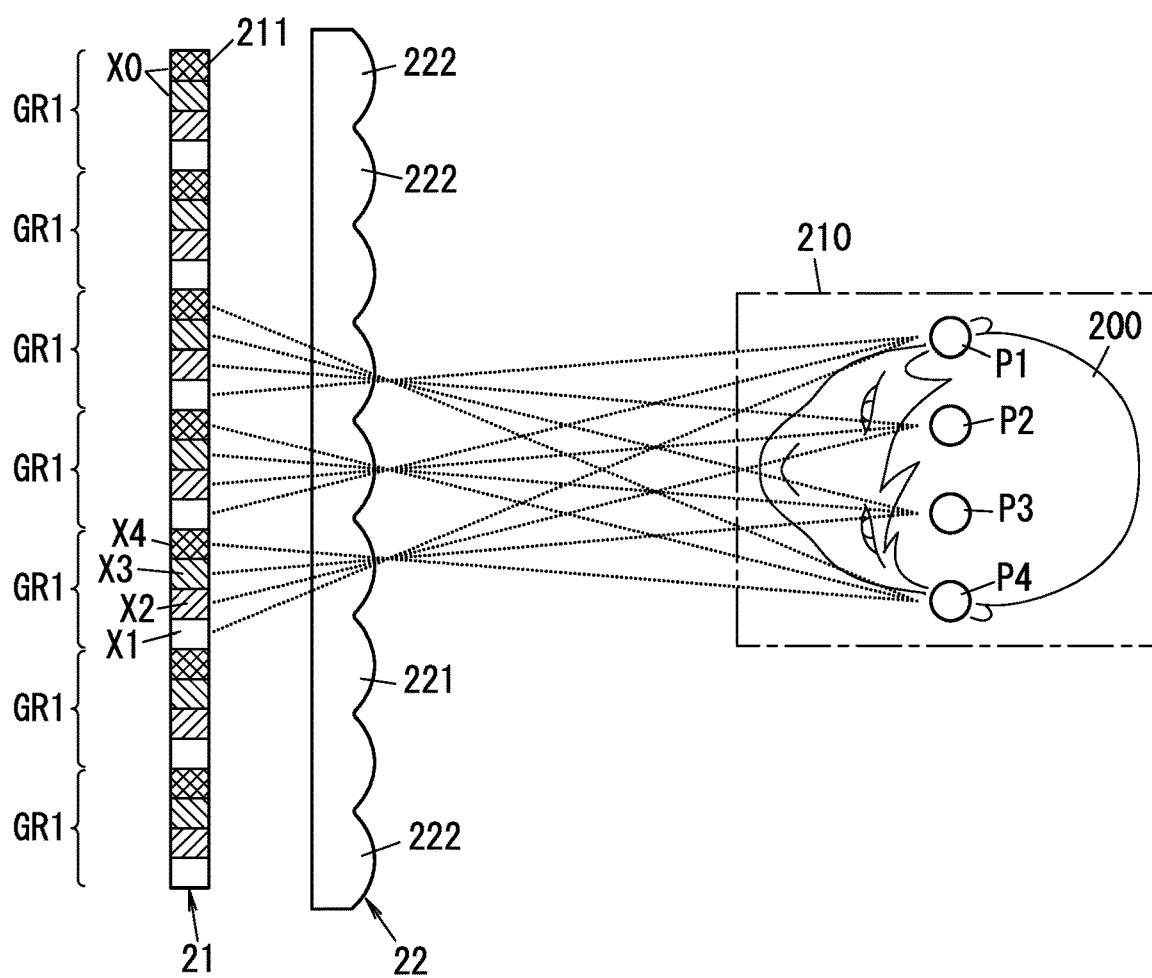
FIG. 5 illustrates how to display a stereoscopic image using the electronic mirror system.

On the display screen 211 of the display device 21, arranged is the lens array 22. In this case, the surface of the lens array 22 constitutes the display screen 221 of the image display unit 20. The lens array 22 includes a plurality of lenses 222 (see FIG. 5) which are arranged to form an array. Each of the plurality of lenses 222 is associated with four pixels X1-X4 out of the plurality of pixels X0 of the display device 21. FIG. 5 illustrates only some of the plurality of pixels X0 of the display device 21. In FIG. 5, each set of four pixels X1-X4, indicated by a bracket GR1, is associated with the same lens 222 out of the plurality of lenses 222.

In the example illustrated in FIG. 5, four viewpoints P1-P4 are set horizontally inside the eye box 210. Onto the viewpoint P1, light beams coming from a plurality of pixels X1 of the display device 21 are focused through a plurality of lenses 222. Onto the viewpoint P2, light beams coming from a plurality of pixels X2 of the display device 21 are focused through a plurality of lenses 222. Onto the viewpoint P3, light beams coming from a plurality of pixels X3 of the display device 21 are focused through a plurality of lenses 222. Onto the viewpoint P4, light beams coming from a plurality of pixels X4 of the display device 21 are focused through a plurality of lenses 222. In this embodiment, the lens array 22 is arranged in front of the display device 21. However, this is only an example and should not be construed as limiting. Alternatively, a member through which a plurality of pinholes are opened to form an array may be arranged, instead of the lens array 22, in front of the display device 21.

The display device 21 of the image display unit 20 displays, on the display screen 211, an image based on the image data supplied from the control unit 50. To display a virtual image 310 of the stereoscopic rendering target, the control unit 50 outputs stereoscopic image data to display the virtual image 310 to the display device 21. The control unit 50 makes four sets of pixels X1, X2, X3, X4 corresponding to the viewpoints P1, P2, P3, P4, respectively, and selected from the plurality of pixels associated with a position where the stereoscopic rendering target is to be projected, display the same image based on the same stereoscopic image data (in other words, a stereoscopic rendering image of a stereoscopic rendering part). As a result, the light beams, emitted from the set of pixels X1 corresponding to the viewpoint P1, cause a virtual image 310, based on the image displayed at the plurality of pixels X1, to be projected onto the viewpoint P1. In the same way, the light beams, emitted from the set of pixels X2 corresponding to the viewpoint P2, cause a virtual image 310, based on the image displayed at the plurality of pixels X2, to be projected onto the viewpoint P2. The light beams, emitted from the set of pixels X3 corresponding to the viewpoint P3, cause a virtual image 310, based on the image displayed at the plurality of pixels X3, to be projected onto the viewpoint P3. The light beams, emitted from the set of pixels X4 corresponding to the viewpoint P4, cause a virtual image 310, based on the image displayed at the plurality of pixels X4, to be projected onto the viewpoint P4. The stereoscopic rendering target captured as the images displayed at the pixels X1-X4 is the same target. Nevertheless, when viewed through the lens array 22, the images displayed at the pixels X1-X4 will look to have slightly different visible angles among the viewpoints P1-P4. The light beam representing the image displayed on the display screen 211 of the display device 21 is eventually condensed into the eye box 210 through the lens array 22.

In addition, the control unit 50 (more specifically, the image data producing unit 52) also produces plane rendering data to have a plane rendering part displayed on the display screen 211. The plane rendering part is the rest of the image displayed on the image display unit 20 other than the stereoscopic rendering target. Specifically, the control unit 50 produces, based on the image data provided by the cameras 41, 42, plane rendering data of a plane rendering part, representing the background, other the stereoscopic rendering target. Then, the control unit 50 has an image based on the plane rendering data (in other words, a plane rendering image of a plane rendering part) displayed at the remaining pixels, other than the pixels used to render the stereoscopic rendering target, out of the plurality of pixels of the display device 21. Note that the light beams emitted from those pixels to display the plane rendering data also pass through the lens array 22. Thus, only the light beams emitted from the pixels corresponding to the viewpoint P1 are incident on the viewpoint P1 and none of the light beams emitted from the pixels corresponding to the other viewpoints P2-P4 is incident on the viewpoint P1.

As can be seen, the image displayed on the display screen 221 includes the image of the plane rendering part based on the plane rendering data and the image of the stereoscopic rendering target based on the stereoscopic image data. Then, the image displayed on the display screen 211 of the display device 21 is viewed by the user 200, who has a viewpoint inside the eye box 210, through the lens array 22 and the optical system 30. For example, when the user's 200 right eye is located at the viewpoint P2 and his or her left eye is located at the viewpoint P3, the light beams emitted from the pixels corresponding to the viewpoint P2 are projected onto his or her right eye and the light beams emitted from the pixels corresponding to the viewpoint P3 are projected onto his or her left eye. As a result, the image as viewed from the viewpoint P2, i.e., an image in which an image of the stereoscopic rendering target as viewed from the viewpoint P2 is superimposed on the background image as viewed from the viewpoint P2, is projected onto the user's 200 right eye. On the other hand, the image as viewed from the viewpoint P3, i.e., an image in which an image of the stereoscopic rendering target as viewed from the viewpoint P3 is superimposed on the background image as viewed from the viewpoint P3, is projected onto the user's 200 left eye. Consequently, a pair of images of the stereoscopic rendering target as viewed from mutually different angles are displayed on the user's 200 right and left eyes to be superimposed on the background image, thus enabling an image reproducing the parallax between his or her right and left eyes to be projected onto his or her eyes. This allows the user 200 to view a stereoscopic virtual image 310 of the stereoscopic rendering target based on the video displayed on the image display unit 20.

Also, if the user 200 turns his or her head to the right, for example, to shift his or her right and left eyes to the viewpoints P1 and P2, respectively, then he or she may view the virtual image 310, which has been viewed from the viewpoints P2 and P3, from a different angle (i.e., from a viewpoint that has shifted slightly to the right).

Note that the light field method is not the only method allowing the image display unit 20 to display the virtual image 310 of the stereoscopic rendering target stereoscopically. Alternatively, the image display unit 20 may also adopt a parallax method, which allows the user 200 to view a virtual image 310 of the stereoscopic rendering target by projecting a pair of images with a parallax onto the user's 200 right and left eyes, respectively.

(2.14) Optical System

The optical system 30 condenses the light beam emerging from the display screen 221 of the image display unit 20 into the eye box 210. In this embodiment, the optical system 30 includes a lens 31, which may be a biconvex lens, for example, and a mirror 32, which may be a plane mirror, as shown in FIGS. 1 and 3.

The lens 31 refracts the light beam emerging from the image display unit 20 to make the light beam incident on the mirror 32. The lens 31 as a biconvex lens refracts the light beam emerging from the image display unit 20, thereby magnifying the image displayed on the display screen 221 of the image display unit 20. In this embodiment, the light beam emerging from the display screen of the image display unit 20 (specifically, the display screen 221 of the lens array 22) obliquely DR2 to a normal DR1 to the display screen 221 is incident on the optical system 30. In other words, the display screen 221 of the image display unit 20 is arranged obliquely with respect to the lens 31 of the optical system 30.

The mirror 32 reflects the light beam, which has been incident thereon from the image display unit 20 through the lens 31, to have the reflected light beam condensed into the eye box 210 through the window member 63.

In this embodiment, the display screen 221 of the image display unit 20 is arranged to be tilted with respect to an optical path L1 (see FIG. 1) leading from the display screen 221 to the optical system 30. The optical path L1 is the optical path of a light beam emerging from a center of the display screen 221 (e.g., a point corresponding to a center in the upward/downward direction and rightward/leftward direction of the image G1 viewed by the user 200) toward the optical system 30. Meanwhile, an optical path L2 indicated by the dotted line in FIG. 1 indicates the optical path of a light beam emerging from one end portion of the display screen 221 (an end portion corresponding to an upper end portion of the image G1 viewed by the user 200; the upper end portion in FIG. 1, for example) to be condensed into the eye box 210 through the optical system 30. Furthermore, an optical path L3 indicated by the dotted line in FIG. 1 indicates the optical path of a light beam emerging from the other end portion of the display screen 221 (an end portion corresponding to a lower end portion of the image G1 viewed by the user 200; the lower end portion in FIG. 1, for example) to be condensed into the eye box 210 through the optical system 30. In this embodiment, the display screen 221 of the image display unit 20 is tilted with respect to the optical path L1, and therefore, the length of the optical path L2 (i.e., the length measured from the eye box 210 to the upper end portion of the display screen 221) is greater than the length of the optical path L3 (i.e., the length measured from the eye box 210 to the lower end portion of the display screen 221). Thus, the virtual image 300 of the plane rendering part, which is based on the series of images displayed on the display screen 221, is viewed by the user 200 as a virtual image 300 (i.e., the image displayed on the display screen 221), of which the display position appears to vary depending on the distance to the upper edge of the virtual image 310 such that the uppermost part of the virtual image 310 looks to the user's 200 eyes as if that part were displayed at a position most distant from the eye box 210. Consequently, the virtual image 300 of the plane rendering part is projected onto a plane PL1 which is tilted with respect to a first plane PL11 parallel to the traveling surface 400 where the automobile 100 equipped with the electronic mirror system 10 is running and to a second plane PL12 perpendicular to the traveling surface 400. Generally speaking, in an image captured by the image capturing unit 40 for shooting video presenting a rear view of the automobile 100, an object captured in an upper part of the image (such as a distant road and the sky) is located more distant from the automobile 100 than an object captured in a lower part of the image (such as a road close to the automobile 100). Therefore, arranging the display screen 221 of the image display unit 20 tilted with respect to the optical path L1 as described above causes the virtual image 300 of the plane rendering part to be projected onto the plane PL1, thus allowing the user 200 to view a virtual image 300 with a natural sense of distance.

(2.1.5) Control Unit

The control unit 50 includes an image analysis unit 51, an image data producing unit 52 (hereinafter simply referred to as a "producing unit 52"), and an output unit 53. In other words, the control unit 50 performs the functions of the image analysis unit 51, the producing unit 52, and the output unit 53. The control unit 50 includes a computer system, for example. The computer system may include one or more processors and one or more memories as principal hardware components. The functions of the control unit 50 (e.g., the functions of the image analysis unit 51, the producing unit 52, and the output unit 53) may be performed by making the one or more processors execute a program stored in the one or more memories of the computer system. The program may be stored in advance in the one or more memories of the computer system. Alternatively, the program may also be downloaded through a telecommunications line or be distributed after having been recorded in some non-transitory storage medium such as a memory card, an optical disc, or a hard disk drive, any of which is readable for the computer system.

The image analysis unit 51 receives camera image data D11, D12 from the two cameras 41, 42 of the image capturing unit 40 through a communications line, for example. The image analysis unit 51 obtains, based on the camera image data D11, D12 provided by the cameras 41, 42, image data D13 falling within the range of the image that has been shot by both of the two cameras 41, 42. In addition, the image analysis unit 51 also obtains, by triangulation method using on the camera image data D11, D12 provided by the cameras 41, 42, distance data D14 about a distance between the object in the image captured by the cameras 41, 42 and an intermediate position between the two cameras 41, 42. Then, the image analysis unit 51 outputs the image data D13 and the distance data D14, obtained based on the camera image data D11, D12 provided by the two cameras 41, 42, to the producing unit 52. In this case, the image analysis unit 51 performs the function of an acquisition unit for acquiring, based on the distance data D11, D12 provided by the plurality of (e.g., two in this embodiment) cameras 41, 42, the distance data D14 about the distance to the object falling within the image capturing ranges of the plurality of cameras 41, 42.

The producing unit 52 extracts, based on the image data D13 and distance data D14 provided by the image analysis unit 51, the stereoscopic rendering target from a plurality of objects in the images captured by the cameras 41, 42. That is to say, the producing unit 52 determines whether each of the plurality of objects in the images captured by the cameras 41, 42 should be rendered as a stereoscopic virtual image that looks protruding from the plane PL1 or an object of a plane rendering part to be rendered along the plane PL1. The producing unit 52 (image data producing unit) obtains a first distance LX1 (see FIG. 1) between the display position of the object and the eye box 210 in a situation where the object in the images captured by the cameras 41, 42 is not projected as a stereoscopic virtual image. The first distance LX1 is an apparent distance in the virtual image space and is the distance between the display position of the object and the eye box 210 in a situation where the object is projected as a virtual image of the plane rendering part. In other words, the first distance LX1 is the viewing distance from the eye box 210 to the virtual image projected onto the plane PL1 aligned with the traveling surface 400. In addition, the producing unit 52 also obtains a second distance in the real space between the object in the images captured by the cameras 41, 42 and the eye box 210. The producing unit 52 obtains the second distance based on the distance data D14 about the distance from the object to an intermediate position between the two cameras 41, 42 and the distance (which is a known value) from the intermediate position between the two cameras 41, 42 to the eye box 210. Then, when finding the absolute value of the difference between the first distance LX1 and the second distance equal to or greater than a predetermined threshold value, the producing unit 52 regards the object as the stereoscopic rendering target. For example, the object to be rendered as a virtual image of the plane rendering part is an object, of which the difference between the distance (second distance) in the real space to the eye box 210 and the first distance LX1 is less than the threshold value. Such an object may be the traveling surface 400 or a guardrail provided along the traveling surface 400, for example. On the other hand, the object to be rendered as a stereoscopic virtual image is an object which looks protruding from the traveling surface 400 and may be another automobile 100 running on the traveling surface 400, for example. As for the object to be rendered as the stereoscopic virtual image, the absolute value of the difference between the distance (second distance) in the real space to the eye box 210 and the first distance LX1 is equal to or greater than the threshold value. Thus, the producing unit 52 may extract the stereoscopic rendering target by comparing the first distance LX1 and the second distance for each of the plurality of objects in the images captured by the cameras 41, 42. In this case, the threshold value is used for determining whether the object should be rendered as a stereoscopic virtual image that looks protruding from the plane PL1 or an object of a plane rendering part to be rendered along the plane PL1. The threshold value may be changed as appropriate according to the environment where the electronic mirror system 10 is used, for example.

The producing unit 52 produces the image data for the plane rendering part such that among the objects in the images captured by the cameras 41, 42, the plane rendering part other than the stereoscopic rendering target is displayed as it is on the display screen 211 of the display device 21.

In addition, the producing unit 52 also produces stereoscopic image data to make the user 200 view the stereoscopic rendering target, among the objects in the images captured by the cameras 41, 42, as a stereoscopic virtual image 310. The producing unit 52 produces the stereoscopic image data to have the same image of the stereoscopic rendering target displayed at the plurality of pixels X1, X2, X3, and X4 among a plurality of pixels corresponding to the position to which the stereoscopic rendering target is projected. That is to say, the producing unit 52 produces, based on the image data D13 and the distance data D14, stereoscopic image data to make the user 200 view a stereoscopic virtual image of the stereoscopic rendering target. The image data D13 is image data of the stereoscopic rendering target captured in the images. The distance data D14 is data about the distance between the stereoscopic rendering target and the eye box 210.

Then, the output unit 53 outputs the plane rendering data and the stereoscopic image data, which have been produced by the producing unit 52, to the display device 21 to have an image, obtained by superimposing the image of the stereoscopic rendering target on the image of the plane rendering part, displayed on the display screen 211 of the display device 21. That is to say, the image display unit 20 displays, on the display screen 221, an image based on the stereoscopic image data produced by the producing unit 52.

(2.2) Operation

Figure 6:
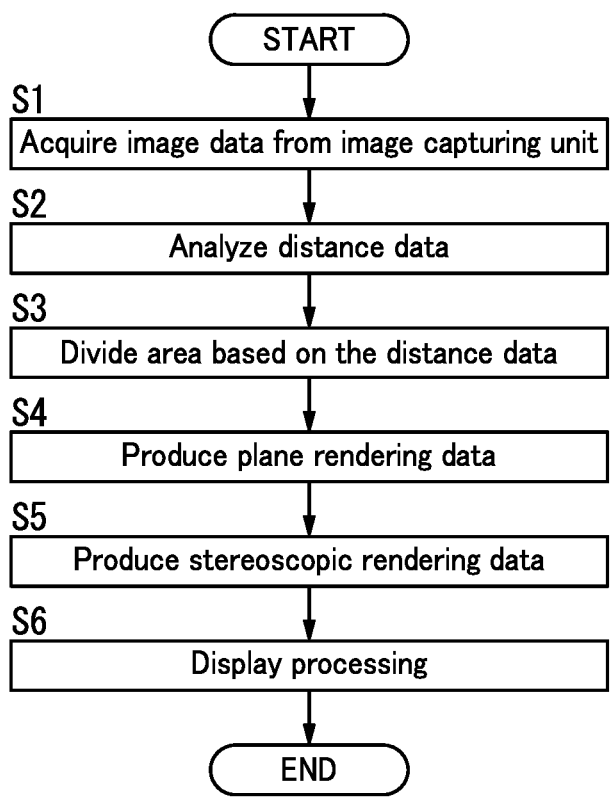
FIG. 6 is a flowchart showing the procedure of operation of the electronic mirror system.

Next, it will be described with reference to the flowchart shown in FIG. 6 how the electronic mirror system 10 according to this embodiment operates.

For example, when receiving a control signal, instructing the electronic mirror system 10 to start operating, from an electronic control unit (ECU) of the automobile 100 while receiving power supplied from a battery of the automobile 100, the electronic mirror system 10 starts operating.

For example, when receiving a control signal from the ECU of the automobile 100, the control unit 50 makes the image capturing unit 40 (cameras 41, 42) capture an image presenting a rear view of the automobile 100 at a predetermined frame rate, thus acquiring image data D11, D12 from the cameras 41, 42 (in S1).

Figure 7:
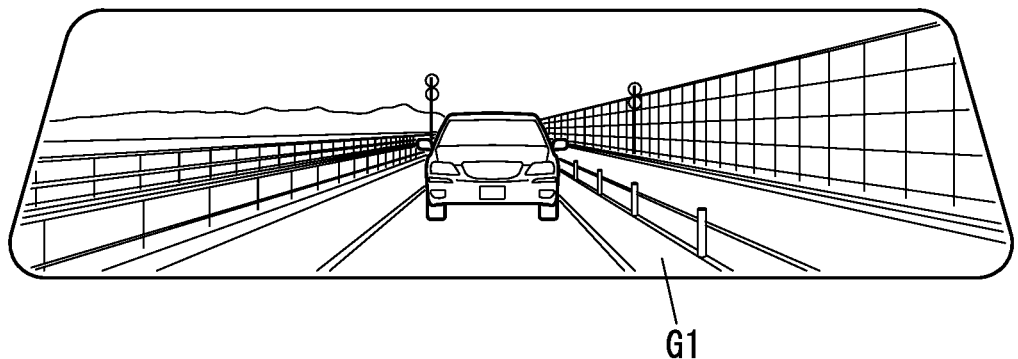
FIG. 7 illustrates an image captured by an image capturing unit of the electronic mirror system.

On acquiring the image data D11, D12, the image analysis unit 51 of the control unit 50 acquires, based on the image data D11, D12, image data D13 of the image G1 falling within the range shot by both the cameras 41, 42 (see FIG. 7) and outputs the image data D13 to the producing unit 52 (in S2). In addition, the image analysis unit 51 also obtains, based on the image data D11, D12, distance data D14 about the distance between the object captured in the image G1 and the cameras 41, 42 and outputs the distance data D14 to the producing unit 52.

Figure 8:
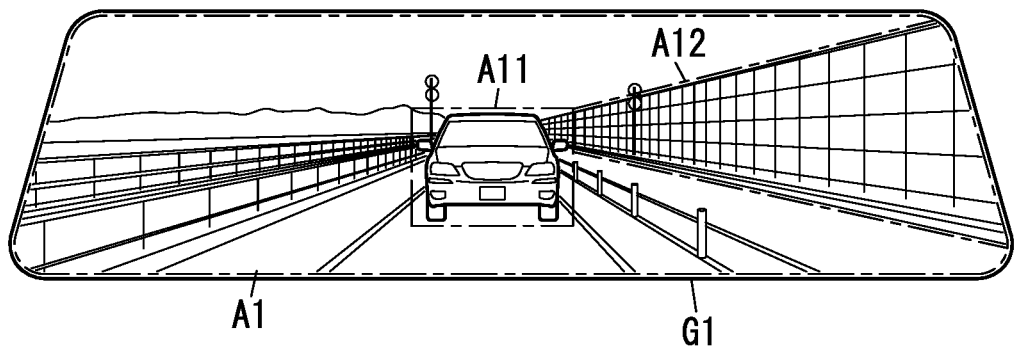
FIG. 8 illustrates an image being processed by an image data producing unit included in the electronic mirror system.

Next, the producing unit 52 performs the following processing steps S4 and S5 to extract, based on the image data D13 and distance data D14 provided by the image analysis unit 51, a stereoscopic rendering target from a plurality of objects captured in the image G1. First, the producing unit 52 divides, in accordance with the distance data D14, the image G1 into a plurality of (e.g., three) areas A1, A11, A12 (see FIG. 8) based on the value of the distance in the real space to the eye box 210 (in S4).

The producing unit 52 determines whether each of the areas A1, A11, A12 should be regarded as an image of a plane rendering part or a stereoscopic rendering image, i.e., whether or not stereoscopic image data should be produced for each of the areas A1, A11, A12.

Figure 9:
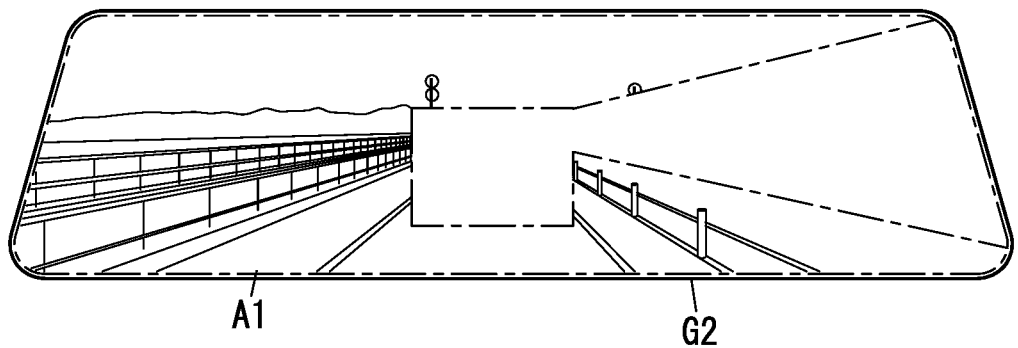
FIG. 9 illustrates another image being processed by the image data producing unit included in the electronic mirror system.

The area A1 is an area where the difference between the first distance LX1 and the second distance becomes less than the threshold value. That is to say, the area A1 is an area where the distance in the real space between the object and the plane PL1 becomes less than the threshold value, supposing the plane PL1 on which a virtual image of the plane rendering part is projected is a default virtual image plane. In this case, the producing unit 52 produces, based on the image data D13, plane rendering data of an image G2 (see FIG. 9) to project the object captured in the area A1 as a virtual image of the plane rendering part (in S4).

Figure 10:
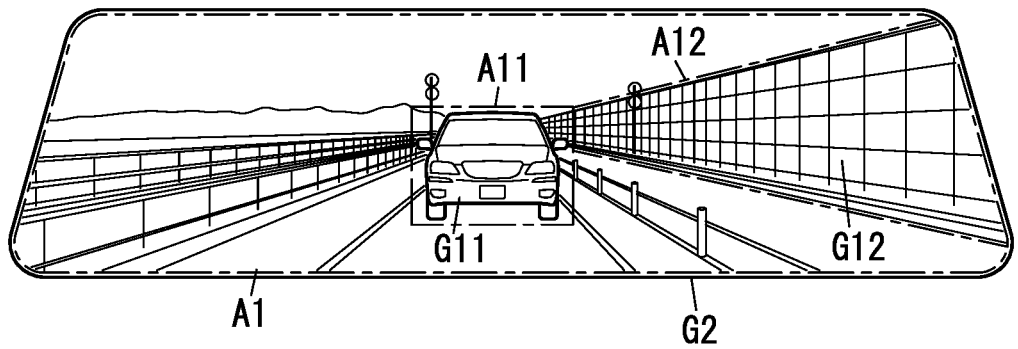
FIG. 10 illustrates still another image being processed by the image data producing unit included in the electronic mirror system.

On the other hand, the areas A11, A12 are areas where the difference between the first distance LX1 and the second distance is equal to or greater than the threshold value. That is to say, the areas A11, A12 are areas where the distance in the real space between the object and the plane PL1 becomes equal to or greater than the threshold value, supposing the plane PL1 on which a virtual image of the plane rendering part is projected is a default virtual image plane. In this case, the producing unit 52 produces, based on the image data D13, stereoscopic image data of images G11, G12 (see FIG. 10) to project the object captured in the area A11 (such as an automobile) and the object captured in the area A12 (such as a protective fence) as stereoscopic virtual images (in S5).

On producing the plane rendering data of the image G2 in the plane rendering part and the stereoscopic image data of the stereoscopic rendering target, the producing unit 52 makes the output unit 53 output image data D15 including the plane rendering data and the stereoscopic image data to the display device 21.

On receiving the image data D15 from the output unit 53, the display device 21 displays, on the display screen 211, one image frame in which the images G11, G12 based on the stereoscopic image data are synthesized with the image G2 of the plane rendering part based on the plane rendering data.

The image displayed on the display screen 211 of the display device 21 is viewed by the user 200, who has a viewpoint inside the eye box 210, through the lens array 22 and the optical system 30. The image G2 of the plane rendering part is displayed as it is on the plurality of pixels of the display device 21, and therefore, recognized as a two-dimensional image by the user 200. The image G2 of the plane rendering part is rendered along the plane PL1, and therefore, may be displayed as the image G2 that gives a natural sense of distance. In addition, making the user 200 view the image of the stereoscopic rendering target through the lens array 22 allows the user 200 to view an image reproducing the parallax between his or her eyes and view the stereoscopic rendering target stereoscopically. This allows the user 200 to view an image in which the images G11, G12 of the stereoscopic rendering target are superimposed on the image G2 of the plane rendering part (i.e., the background). In this manner, the electronic mirror system 10 allows the user 200 to view an image which gives him or her a natural sense of distance and which enables him or her to adjust the focus easily. In addition, the electronic mirror system 10 has only to produce stereoscopic image data for the stereoscopic rendering target with the image data acquired from the image capturing unit 40 used as it is as the plane rendering data of the plane rendering part. This may reduce the processing load imposed by the arithmetic processing for producing the stereoscopic image data.

Optionally, in S4, the producing unit 52 may use the image data D13 of the original image G1 as it is as the plane rendering data, instead of the plane image data consisting of the plane rendering part. Then, the producing unit 52 produces one image frame to be displayed on the display device 21 by combining the plane rendering data used when the original image G1 is rendered in its entirety on the plane PL1 with the stereoscopic image data produced in Step S5. That is to say, the producing unit 52 may produce one image frame in which the images G11, G12 of the stereoscopic rendering target are superimposed on the image of the plane rendering part (i.e., the original image G1) and display the image on the display device 21.

(3) Variation

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Optionally, the functions of the electronic mirror system 10 may also be implemented as, for example, a method for controlling the electronic mirror system 10, a computer program, or a non-transitory storage medium on which a program is stored. An image display method according to an aspect is a method for displaying an image by using the electronic mirror system 10. The image display method includes first, second, third, and fourth processing steps. The first processing step includes acquiring image information about image data of a stereoscopic rendering part including at least a stereoscopic rendering target of the image (Step S1). The second processing step includes acquiring distance data about the distance in the real space between the target and the eye box 210 (Step S2). The third processing step includes producing, based on the image information and the distance data, stereoscopic image data to make the user 200, who has a viewpoint inside the eye box 210, view a stereoscopic virtual image of the target (Step S5). The fourth processing step includes displaying, on the display screen 221 of the image display unit 20, an image based on the stereoscopic image data (Step S6). A (computer) program according to another aspect is designed to cause one or more processors to perform the image display method.

Next, variations of the exemplary embodiment described above will be enumerated one after another. Note that the variations to be described below may be adopted in combination as appropriate. Also, in the following description, the exemplary embodiment described above will be hereinafter sometimes referred to as a "basic example."

The electronic mirror system 10 according to the present disclosure includes a computer system. The computer system may include a processor and a memory as principal hardware components thereof. The functions of the electronic mirror system 10 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, in the embodiment described above, the plurality of constituent elements (or the functions) of the electronic mirror system 10 are integrated together in a single housing 60. However, this is not an essential configuration for the electronic mirror system 10. Alternatively, those constituent elements (or functions) of the electronic mirror system 10 may be distributed in multiple different housings. Still alternatively, at least some functions of the electronic mirror system 10 (e.g., some functions of the control unit 50 (such as the image analysis unit 51 and the producing unit 52) may be implemented as a cloud computing system as well.

Furthermore, in the foregoing description of the embodiments, if one of two values (such as distance values) being compared with each other is "equal to or greater than" the other, this phase may be a synonym of the phrase "greater than.". That is to say, it is arbitrarily changeable, depending on selection of a reference value or any preset value, whether or not the phrase "equal to or greater than" covers the situation where the two values are equal to each other. Therefore, from a technical point of view, there is no difference between the phrase "equal to or greater than" and the phrase "greater than." Similarly, the phrase "less than" may be a synonym of the phrase "equal to or less than" as well.

(3.1) First Variation

Figure 11:
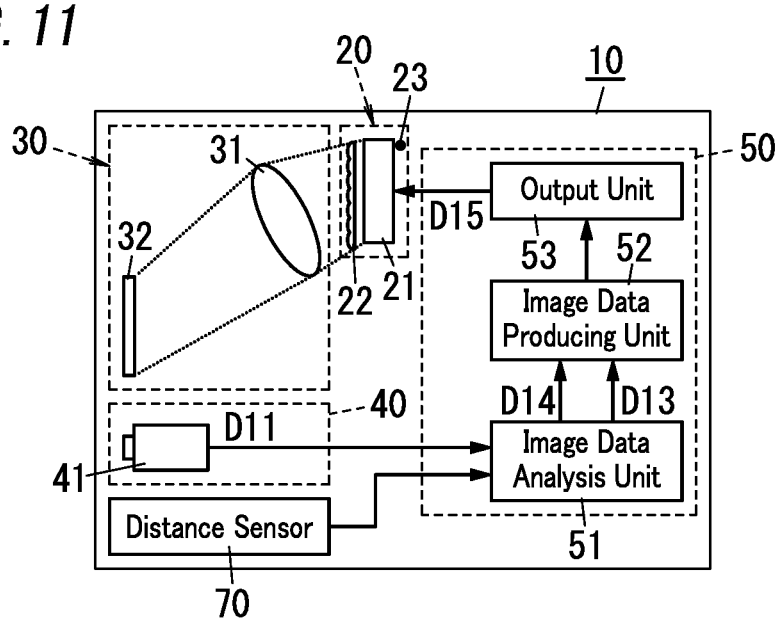
FIG. 11 is a schematic block diagram of an electronic mirror system according to a first variation of the exemplary embodiment of the present disclosure.

In the electronic mirror system 10 according to the basic example, the image analysis unit 51 acquires distance data based on the image data provided by the two cameras 41, 42. Alternatively, the electronic mirror system 10 may include a distance sensor 70 for acquiring the distance data as shown in FIG. 11.

In the electronic mirror system 10 according to the first variation, the image capturing unit 40 includes a single camera 41 for shooting video presenting a rear view of the automobile 100.

The distance sensor 70 includes a sensor such as a milli-wave radar or a light detection and ranging (LIDAR) sensor. The distance sensor 70 measures a distance from the distance sensor 70 itself to an object present within the image capturing range of the camera 41 and outputs distance data indicating the result of measurement to the image analysis unit 51.

The image analysis unit 51 acquires the distance data from the distance sensor 70. That is to say, the image analysis unit 51 performs the function of an acquisition unit for acquiring the distance data from the distance sensor 70 for measuring the distance to the object present within the image capturing range of the image capturing unit 40. The image analysis unit 51 produces, based on the image data acquired from the image capturing unit 40 and the distance data acquired from the distance sensor 70, plane rendering data to display an image of a plane rendering part and stereoscopic image data to make stereoscopic rendering. The image analysis unit 51 performs the processing of producing the plane rendering data and the stereoscopic image data in the same way as in the basic example, and description thereof will be omitted herein.

(3.2) Second Variation

In the basic example, the image display unit 20 is implemented as a single display device 21. However, this is only an example of the present disclosure and should not be construed as limiting. Alternatively, an image display unit 20A may include a plurality of (e.g., two) display devices 21A, 21B, each of which is configured to display an associated part of the entire image to be displayed by the image display unit 20A. Each of the plurality of display devices 21A, 21B displays a partial image, which forms part of the entire image to be displayed by the image display unit 20A. The respective display screens 211A, 211B of the display devices 21A, 21B are tilted with respect to each other. In addition, the image display unit 20A further includes a lens array 22A arranged on the display screen 211A of the display device 21A and a lens array 22B arranged on the display screen 211B of the display device 21B.

The display device 21A is tilted in the same direction with respect to the optical path L1 as the display device 21 that has been described for the basic example. Specifically, the display device 21A is arranged such that with respect to a focal point 23 of the optical system 30 made up of the lens 31 and the mirror 32, a first interval between one end portion (i.e., the upper end portion in FIG. 12) of the display screen 211A of the display device 21A and the focal point 23 becomes shorter than a second interval between the other end portion (i.e., the lower end portion in FIG. 12) of the display screen 211A and the focal point 23. This allows the user 200 to view the image displayed on the display screen 211A of the display device 21A such that the object captured in an upper part of the display screen 211A of the display device 21A through the lens array 22A and the optical system 30 appears to be present more distant than the object captured in a lower part of the display screen 211A.

On the other hand, the display device 21B is arranged such that a first interval between one end portion (i.e., the lower end portion in FIG. 12) of the display screen 211B of the display device 21B and the focal point 23 becomes shorter than a second interval between the other end portion (i.e., the upper end portion in FIG. 12) of the display screen 211B and the focal point 23. This allows the user 200 to view the image displayed on the display screen 211B of the display device 21B such that the object captured in an upper part of the display screen 211B of the display device 21B appears to be present closer than the object captured in a lower part of the display screen 211B. In this second variation, the image display unit 20A is also arranged between the optical system 30 and the focal point 23 of the optical system 30.

Figure 12:
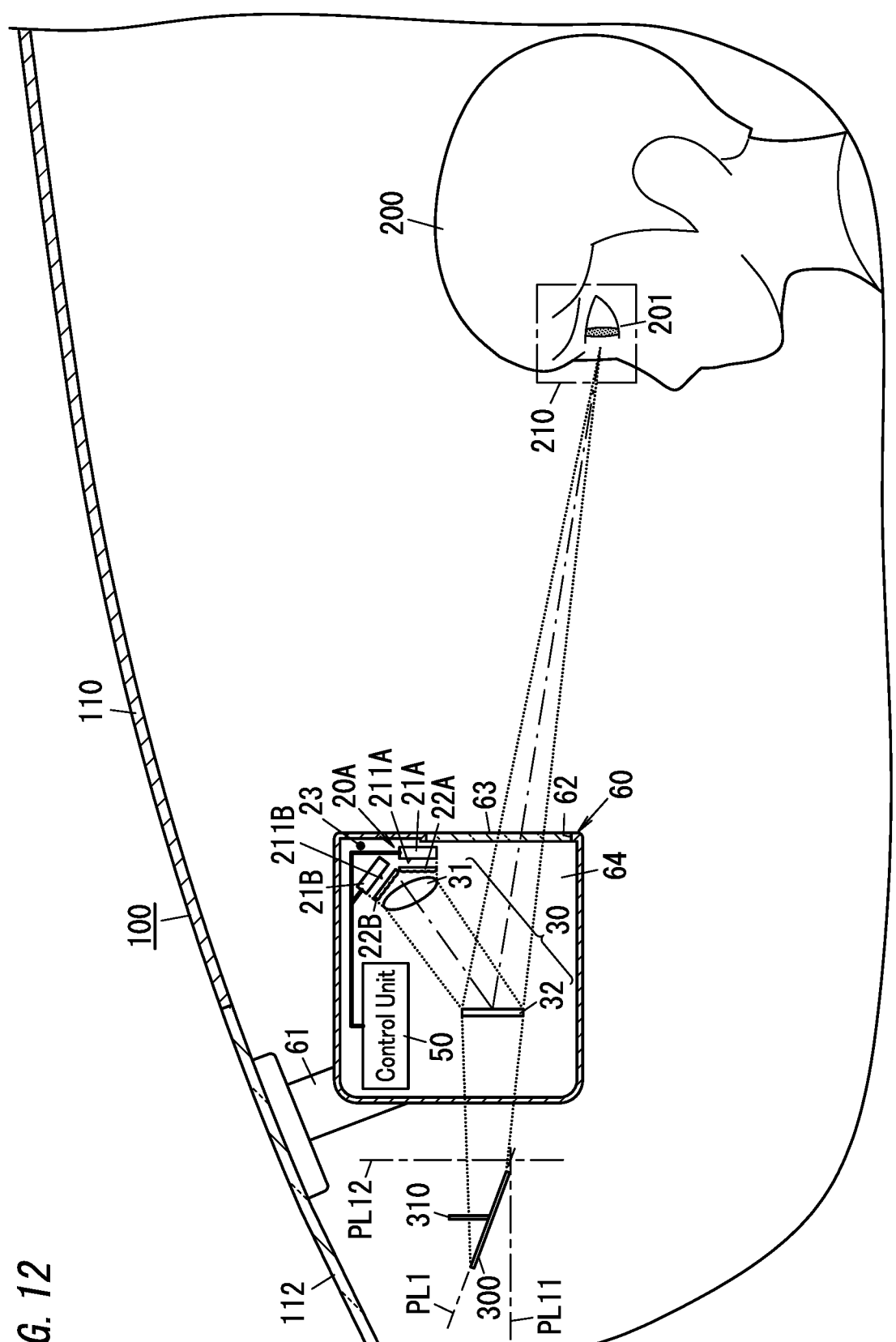
FIG. 12 schematically illustrates an electronic mirror system according to a second variation of the exemplary embodiment of the present disclosure.

For example, in a situation where a road sign or anything else installed over a lane line of a road is captured in an upper part of the image displayed on the image display unit 20A, the objects captured in lower and upper parts of the image come to have a shorter distance from the eye box 210 than an object captured in a middle part in the upward/downward direction of the image. In such a situation, the two display devices 21A, 21B are suitably arranged as shown in FIG. 12. This may give the image displayed on the image display unit 20A a natural sense of distance.

In the second variation, the image display unit 20A includes the two partial image display units (display devices 21A, 21B). Alternatively, the image display unit 20A may include three or more partial image display units. In addition, the plurality of partial image display units (display devices 21A, 21B) included in the image display unit 20A do not have to be arranged as shown in FIG. 12. Rather, the arrangement of the plurality of partial image display units (display devices 21A, 21B) may be changed as appropriate such that the image viewed by the user 200 is given a natural sense of distance.

(3.3) Other Variations

In the electronic mirror system 10 according to the exemplary embodiment and variations described above, the image displayed by the image display unit 20 is divided into a plurality of areas according to the distance between an object captured in the image and the eye box 210 and a decision is made whether or not the object in each of those areas should be a stereoscopic rendering target. Alternatively, the decision whether or not the object should be a stereoscopic rendering may also be made on a pixel-by-pixel basis.

Also, in the embodiment described above, the producing unit 52 produces stereoscopic image data for only a part, including an object to be the stereoscopic rendering target, of the image displayed on the image display unit 20. Alternatively, the entire image displayed on the image display unit 20 may be the stereoscopic rendering target.

In the electronic mirror system 10 according to the embodiment and variations described above, the window member 63 provided for the housing 60 may be configured as a half mirror, for example. When no images are displayed on the display screen 221 of the image display unit 20, the window member 63 configured as a half mirror serves as a mirror. This allows the user 200 to take a rear view by using the window member 63 serving as a mirror.

In the electronic mirror system 10 according to the embodiment and variations described above, the optical system 30 only needs to project, into the eye box 210, a light beam that has come from the image display unit 20 and incident thereon by reflecting and/or refracting the light beam. Thus, the configuration of the optical system 30 may be changed as appropriate. For example, even though the lens 31 is a biconvex lens in the embodiment described above, the lens 31 may also be a plano-convex lens. Alternatively, the surface of the lens 31 may also be formed as a free-form surface to enable reducing the distortion of the image and increasing the resolution thereof. Furthermore, even though the mirror 32 is a plane mirror in the embodiment described above, the mirror 32 may also be a concave mirror having a free-form surface. The surface of the mirror 32 may be formed as a free-form surface to enable reducing the distortion of the image and increasing the resolution thereof. Optionally, the optical system 30 may also be configured as one or more lenses, one or more mirrors, or a combination of one or more lenses and one or more mirrors.

In the electronic mirror system 10 according to the exemplary embodiment and variations described above, the display device 21 is implemented as a display device such as a liquid crystal display or an organic electroluminescent display. However, the display device 21 does not have to be this type of display device. Alternatively, the display device 21 may also be configured to render an image on a diffusion-transmission type screen by scanning the screen with a laser beam radiated from behind the screen. Still alternatively, the display device 21 may also be configured to project an image onto a diffusion-transmission type screen from a projector arranged behind the screen.

The electronic mirror system 10 according to the embodiment and variations described above is fixed at a position where a rearview mirror is usually provided. Alternatively, the electronic mirror system 10 may also be fixed at a position where an electronic door mirror is provided, i.e., under an A-pillar or inside a door. Also, although the electronic mirror system 10 is fixed on the moving vehicle body 110 in the embodiment and variations described above, the electronic mirror system 10 according to the embodiment and variations is also applicable to a head mount display to be worn and used by the user 200 on the head or a display device in the shape of eyeglasses.

The electronic mirror system 10 according to the exemplary embodiment and variations described above is configured to capture and display an image presenting a rear view for the driver of the automobile 100. However, this is only an example and should not be construed as limiting. Alternatively, the electronic mirror system 10 may also display an image based on a captured image presenting a rear side view, a side view, or a front view for the driver of the automobile 100.

In the exemplary embodiment and variations described above, the electronic mirror system 10 is applied to the automobile 100. However, this is only an example and should not be construed as limiting. The electronic mirror system 10 is also applicable to two-wheeled vehicles, railway trains, aircrafts, construction machines, watercrafts, and various types of moving vehicles other than automobiles 100.

The electronic mirror system 10 does not have to be implemented as a single device but may be made up of multiple devices as well. That is to say, the respective functions of the electronic mirror system 10 may be performed dispersedly by two or more devices. For example, the functions of the control unit 50 of the electronic mirror system 10 may be performed separately by an electronic control unit (ECU) of the automobile 100 or by a server device provided outside of the automobile 100. In that case, the image to be displayed on the image display unit 20 is produced by either the ECU or the server device.

(Recapitulation)

As can be seen from the foregoing description, an electronic mirror system (10) according to a first aspect presents circumstances surrounding a moving vehicle (100) by displaying an image presenting the circumstances surrounding the moving vehicle (100). The electronic mirror system (10) includes an image display (20) and an optical system (30). The image display (20) displays, every time image data is acquired from an image capturing unit (40), the image, based on the image data acquired from the image capturing unit (40), on a display screen (221). The image capturing unit (40) continuously shoots video presenting the circumstances surrounding the moving vehicle (100). The optical system (30) condenses, into an eye box (210), a light beam representing the image displayed on the display screen (221) to make a user (200), who has a viewpoint inside the eye box (210), view a virtual image (300) based on the image displayed on the display screen (221). The display screen (221) is arranged to be tilted with respect to an optical path (L1) that leads from the display screen (221) to the optical system (30).

According to this aspect, the display screen (221) is tilted with respect to an optical path (L1) that leads from the display screen (221) to the optical system (30), and therefore, a viewing distance between the eye box (210) and the display screen (221) varies within the plane defined by the display screen (221). This allows providing an electronic mirror system (10) which may increase the degree of visibility by giving a natural sense of distance to the virtual image (300) to be viewed by the user (200) based on the image displayed on the display screen (221).

An electronic mirror system (10) according to a second aspect, which may be implemented in conjunction with the first aspect, further includes an image data producing unit (52). The image data producing unit (52) produces, based on image data of a stereoscopic rendering target captured in the image displayed on the display screen (221) and distance data, stereoscopic image data to make the user (200) view a stereoscopic virtual image (310) of the stereoscopic rendering target. The distance data is data about a distance in a real space between the stereoscopic rendering target and the eye box (210). The image display (20) displays, on the display screen (221), a stereoscopic rendering image of a stereoscopic rendering part based on the stereoscopic image data.

This aspect allows providing an electronic mirror system (10) which may increase the degree of visibility.

In an electronic mirror system (10) according to a third aspect, which may be implemented in conjunction with the second aspect, the image data producing unit (52) further produces plane rendering data to have a plane rendering part displayed on the display screen (221). The plane rendering part forms part of the image displayed on the display screen (221) and is other than the stereoscopic rendering target. The image displayed on the display screen (221) includes: an image of the plane rendering part based on the plane rendering data; and the stereoscopic rendering image.

This aspect allows providing an electronic mirror system (10) which may increase the degree of visibility.

In an electronic mirror system (10) according to a fourth aspect, which may be implemented in conjunction with the second aspect, the image data producing unit (52) regards, when an absolute value of difference between a first distance and a second distance is equal to or greater than a predetermined threshold value, an object as the stereoscopic rendering target. The first distance is a distance between a display position of the object and the eye box (210) in a situation where a virtual image of the object captured in the image displayed on the display screen (221) is not projected as the stereoscopic rendering target. The second distance is a distance in a real space between the object and the eye box (210).

This aspect allows providing an electronic mirror system (10) which may increase the degree of visibility.

In an electronic mirror system (10) according to a fifth aspect, which may be implemented in conjunction with any one of the second to fourth aspects, the image data producing unit (52) divides, based on a value of the distance in the real space to the eye box (210), the image displayed on the image display (20) into a plurality of partial images. The image data producing unit (52) determines, with respect to each of the plurality of partial images, whether or not the stereoscopic image data is to be produced.

This aspect allows providing an electronic mirror system (10) which may increase the degree of visibility.

In an electronic mirror system (10) according to a sixth aspect, which may be implemented in conjunction with any one of the second to fifth aspects, the image capturing unit (40) includes a plurality of cameras (41, 42) having mutually different shooting directions. The electronic mirror system (10) further includes an acquisition unit (51). The acquisition unit (51) acquires, based on image data provided by each of the plurality of cameras (41, 42), the distance data about the distance to the object present within an image capturing range of each of the plurality of cameras (41, 42).

This aspect allows providing an electronic mirror system (10) which may increase the degree of visibility.

An electronic mirror system (10) according to a seventh aspect, which may be implemented in conjunction with any one of the second to sixth aspects, further includes an acquisition unit (51) that acquires the distance data from a distance sensor (70). The distance sensor (70) measures a distance to an object present within an image capturing range of the image capturing unit (40).

This aspect allows providing an electronic mirror system (10) which may increase the degree of visibility.

In an electronic mirror system (10) according to an eighth aspect, which may be implemented in conjunction with any one of the first to seventh aspects, the image display (20) includes a plurality of display devices (21A, 21B). Each of the plurality of display devices (21A, 21B) displays an associated part of an entire image displayed on the image display (20). Respective display screens (211A, 211B) of the plurality of display devices (21A, 21B) are tilted with respect to each other.

This aspect allows providing an electronic mirror system (10) which may increase the degree of visibility.

In an electronic mirror system (10) according to a ninth aspect, which may be implemented in conjunction with any one of the first to eighth aspects, a light beam emerging from the display screen (221) of the image display (20), obliquely (DR2) to a normal (DR1) to the display screen (221) is incident on the optical system (30).

This aspect allows providing an electronic mirror system (10) which may increase the degree of visibility.

An image display method according to a tenth aspect is a method for displaying the image in the electronic mirror system (10) according to any one of the first to ninth aspects. The image display method includes first, second, third, and fourth processing steps. The first processing step includes acquiring image data from the image capturing unit. The second processing step includes acquiring distance data about a distance in a real space between a target captured in the image displayed on the image display (20) and the eye box (210). The third processing step includes producing, based on the image data and the distance data, stereoscopic image data to make a user (200), who has a viewpoint inside the eye box (210), view a stereoscopic virtual image of the target. The fourth processing step includes displaying, on the display screen (221) of the image display (20), a stereoscopic rendering image of a stereoscopic rendering part based on the stereoscopic image data.

This aspect allows providing an image display method which may increase the degree of visibility.

A moving vehicle (100) according to an eleventh aspect includes: a moving vehicle body (110) that moves; and the electronic mirror system (10) according to any one of the first to ninth aspects installed in the moving vehicle body (110).

This aspect allows providing a moving vehicle (100) equipped with an electronic mirror system (10) which may increase the degree of visibility.

In an electronic mirror system (10) according to a twelfth aspect, which may be implemented in conjunction with any one of the first to ninth aspects, the image capturing unit (40) captures an image of an environment outside of the moving vehicle body (110).

This aspect allows providing a moving vehicle (100) equipped with an electronic mirror system (10) which may increase the degree of visibility.

In an electronic mirror system (10) according to a thirteenth aspect, which may be implemented in conjunction with any one of the first to ninth aspects and the twelfth aspect, the image display (20) includes: a display device (21) that displays the image thereon; and a lens array (22) including a plurality of lenses (222) which are arranged to form an array and provided in front of the display device (21)

Note that these are not the only aspects of the present disclosure. Rather, various configurations of the electronic mirror system (10) according to the exemplary embodiment described above (including variations thereof) may also be implemented as an image display method using the electronic mirror system (10), a (computer) program, or a non-transitory storage medium that stores a program thereon, for example.

Note that the constituent elements according to the second to ninth, twelfth, and thirteenth aspects are not essential constituent elements for the electronic mirror system (10) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An electronic mirror system that presents circumstances surrounding a moving vehicle by displaying an image presenting the circumstances surrounding the moving vehicle, the electronic mirror system comprising:
   an image display that displays, every time image data is acquired from a camera, the image, based on the image data acquired from the camera, on a display screen, the camera continuously shooting video presenting the circumstances surrounding the moving vehicle; and
   an optical system that includes a mirror and condenses, into an eye box, a light beam representing the image displayed on the display screen to allow a user, who has a viewpoint inside the eye box, to view a virtual image based on the image displayed on the display screen, wherein
   the display screen is arranged to be tilted with respect to an optical path that leads from the display screen to the optical system, the image display emits light, that forms the image, downward toward the mirror, and the mirror reflects the light, emitted from the image display, directly from the image display and downward toward the user.

2. The electronic mirror system of claim 1, wherein
the image display includes a plurality of display devices, each of the plurality of display devices displaying an associated part of an entire image displayed on the image display, and
respective display screens of the plurality of display devices are tilted with respect to each other.

3. The electronic mirror system of claim 1, wherein
a light beam emerging, from the display screen of the image display, obliquely to a normal to the display screen is incident on the optical system.

4. The electronic mirror system of claim 1, further comprising:
a processor; and
a memory including at least one set of instructions that, when executed by the processor, causes the processor to perform operations, the operations including:
producing, based on image data of a stereoscopic rendering target captured in the image displayed on the display screen and distance data about a distance in a real space between the stereoscopic rendering target and the eye box, stereoscopic image data to allow the user to view a stereoscopic virtual image of the stereoscopic rendering target, wherein
the image display displays, on the display screen, a stereoscopic rendering image of a stereoscopic rendering part based on the stereoscopic image data.

5. The electronic mirror system of claim 4, wherein
the processor regards, when an absolute value of difference between a first distance and a second distance is equal to or greater than a predetermined threshold value, an object as the stereoscopic rendering target,
the first distance is a distance between a display position of the object and the eye box in a situation where a virtual image of the object captured in the image displayed on the display screen is not projected as the stereoscopic rendering target, and
the second distance is a distance in the real space between the object and the eye box.

6. The electronic mirror system of claim 4, wherein
the processor divides, based on a value of the distance in the real space between the stereoscopic rendering target and the eye box, the image displayed on the image display into a plurality of partial images, and
the processor determines, with respect to each of the plurality of partial images, whether or not the stereoscopic image data is to be produced.

7. The electronic mirror system of claim 4, wherein
the camera includes a plurality of cameras having mutually different shooting directions, and
the processor acquires, based on image data provided by each of the plurality of cameras, distance data about a distance to an object present within an image capturing range of each of the plurality of cameras.

8. The electronic mirror system of claim 4, wherein
the processor acquires the distance data from a distance sensor, and
the distance sensor measures a distance to an object present within an image capturing range of the camera.

9. The electronic mirror system of claim 4, wherein
the image display includes a plurality of display devices, each of the plurality of display devices displaying an associated part of an entire image displayed on the image display, and
respective display screens of the plurality of display devices are tilted with respect to each other.

10. The electronic mirror system of claim 4, wherein
the processor further produces plane rendering data to have a plane rendering part displayed on the display screen, the plane rendering part forming part of the image displayed on the display screen and being different than the stereoscopic rendering target, and
the image includes: a plane rendering image of the plane rendering part based on the plane rendering data; and the stereoscopic rendering image.

11. The electronic mirror system of claim 10, wherein
the processor divides, based on a value of the distance in the real space between the stereoscopic rendering target and the eye box, the image displayed on the image display into a plurality of partial images, and
the processor determines, with respect to each of the plurality of partial images, whether or not the stereoscopic image data is to be produced.

12. The electronic mirror system of claim 10, wherein
the camera includes a plurality of cameras having mutually different shooting directions, and
the processor acquires, based on image data provided by each of the plurality of cameras, distance data about a distance to an object present within an image capturing range of each of the plurality of cameras.

13. The electronic mirror system of claim 10, wherein
the processor acquires the distance data from a distance sensor, and
the distance sensor measures a distance to an object present within an image capturing range of the camera.

14. The electronic mirror system of claim 10, wherein
the image display includes a plurality of display devices, each of the plurality of display devices displaying an associated part of an entire image displayed on the image display, and
respective display screens of the plurality of display devices are tilted with respect to each other.

15. The electronic mirror system of claim 5, wherein
the processor divides, based on a value of the distance in the real space between the stereoscopic rendering target and the eye box, the image displayed on the image display into a plurality of partial images, and
the processor determines, with respect to each of the plurality of partial images, whether or not the stereoscopic image data is to be produced.

16. The electronic mirror system of claim 5, wherein
the camera includes a plurality of cameras having mutually different shooting directions, and
the processor acquires, based on image data provided by each of the plurality of cameras, distance data about a distance to an object present within an image capturing range of each of the plurality of cameras.

17. The electronic mirror system of claim 5, wherein
the processor acquires the distance data from a distance sensor, and
the distance sensor measures a distance to an object present within an image capturing range of the camera.

18. The electronic mirror system of claim 6, wherein
the processor acquires the distance data from a distance sensor, and
the distance sensor measures a distance to an object present within an image capturing range of the camera.

19. An image display method of an electronic mirror system, the electronic mirror system presenting circumstances surrounding a moving vehicle by displaying an image presenting the circumstances surrounding the moving vehicle, the image display method comprising:

- displaying, every time image data is acquired from a camera, the image, based on the image data acquired from the camera, on a display screen, the camera continuously shooting video presenting the circumstances surrounding the moving vehicle; and
- condensing, by an optical system including a mirror, into an eye box, a light beam representing the image displayed on the display screen to allow a user, who has a viewpoint inside the eye box, to view a virtual image based on the image displayed on the display screen, wherein
- the display screen is arranged to be tilted with respect to an optical path that leads from the display screen to the optical system,
- the image display emits light, that forms the image, downward toward the mirror, and
- the mirror reflects the light, emitted from the image display, directly from the image display and downward toward the user.

20. A moving vehicle, comprising:

a moving vehicle body that moves; and an electronic mirror system installed in the moving vehicle body, the electronic mirror system presenting circumstances surrounding the moving vehicle, the electronic mirror system comprising:

- an image display that displays, every time image data is acquired from a camera, an image, based on the image data acquired from the camera, on a display screen, the camera continuously shooting video presenting the circumstances surrounding the moving vehicle; and
- an optical system that includes a mirror and condenses, into an eye box, a light beam representing the image displayed on the display screen to allow a user, who has a viewpoint inside the eye box, to view a virtual image based on the image displayed on the display screen, wherein the display screen is arranged to be tilted with respect to an optical path that leads from the display screen to the optical system, the image display emits light, that forms the image, downward toward the mirror, and the mirror reflects the light, emitted from the image display, directly from the image display and downward toward the user.

* * * * *